(12) United States Patent
Inoue et al.

(10) Patent No.: US 6,788,821 B2
(45) Date of Patent: Sep. 7, 2004

(54) DIGITAL INFORMATION EMBEDDING/ EXTRACTING APPARATUS AND METHOD, AND MEDIUM INCLUDING A PROGRAM FOR EXECUTING THE METHOD RECORDED THEREON

(75) Inventors: Hisashi Inoue, Fukuoka (JP); Takashi Katsura, Fukuoka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 606 days.

(21) Appl. No.: 09/879,136

(22) Filed: Jun. 13, 2001

(65) Prior Publication Data

US 2002/0009209 A1 Jan. 24, 2002

(30) Foreign Application Priority Data

Jun. 14, 2000 (JP) ........................................ 2000-177942

(51) Int. Cl.[7] .............................. G06K 9/46; H04N 7/12
(52) U.S. Cl. .................................. 382/248; 375/240.18
(58) Field of Search ......................... 382/100, 232–236, 382/240–253; 341/67; 375/240.21–240.25, 240.18; 380/54, 269; 708/203; 713/176

(56) References Cited

U.S. PATENT DOCUMENTS

| | | | | |
|---|---|---|---|---|
| 5,778,102 A | * | 7/1998 | Sandford et al. | 382/251 |
| 5,809,139 A | * | 9/1998 | Girod et al. | 380/202 |
| 5,848,155 A | | 12/1998 | Cox | |
| 5,915,027 A | * | 6/1999 | Cox et al. | 380/54 |
| 6,122,392 A | * | 9/2000 | Rhoads | 382/100 |
| 6,240,121 B1 | * | 5/2001 | Senoh | 375/130 |
| 6,282,299 B1 | * | 8/2001 | Tewfik et al. | 382/100 |
| 6,453,053 B1 | | 9/2002 | Wakasu | |
| 6,542,618 B1 | * | 4/2003 | Rhoads | 382/100 |
| 6,694,040 B2 | * | 2/2004 | Hayashi et al. | 382/100 |

FOREIGN PATENT DOCUMENTS

| | | |
|---|---|---|
| JP | 10-191330 | 7/1998 |
| JP | 10-308867 | 11/1998 |
| JP | 2000-050048 | 2/2000 |

OTHER PUBLICATIONS

"Digital Watermarking of Raw and Compressed Video", Frank Hartung and Bernd Girod, Proceedings SPIE vol. 2952, pp. 205–213, Oct. 1996.
"A DCT–domain system for robust image watermarking", Mauro Barni et al., Signal Processing vol. 66, pp. 357–372, 1998.
"A DWT–based technique for spatio–frequency masking of digital signatures", M. Barni et al., SPIE vol. 3657, pp. 31–39, Jan. 1999.

* cited by examiner

Primary Examiner—Jayanti K. Patel
(74) Attorney, Agent, or Firm—Wenderoth, Lind & Ponack, L.L.P.

(57) ABSTRACT

In an embedding apparatus, a transform section divides an original image into a plurality of blocks to perform orthogonal transform every block. An embedding section embeds a pseudo-random number sequence mapped with inherent digital information in part of a transform coefficients sequence obtained by the orthogonal transform using a weight sequence. In an extracting apparatus, a calculation section reads transform coefficients sequences for respective blocks from the data including the pseudo-random number sequence embedded therein in a predetermined order, and calculates an inner product between the transform coefficients sequences and a pseudo-random number sequence. A determination section determines that the pseudo-random number sequence has been embedded when the inner product is greater than a predetermined threshold value. A generation section extracts inherent digital information mapped with the determined pseudo-random number sequence. This method discourages deciphering of the digital information, suppresses image quality deterioration, and improves the detection rate of watermark data.

33 Claims, 11 Drawing Sheets

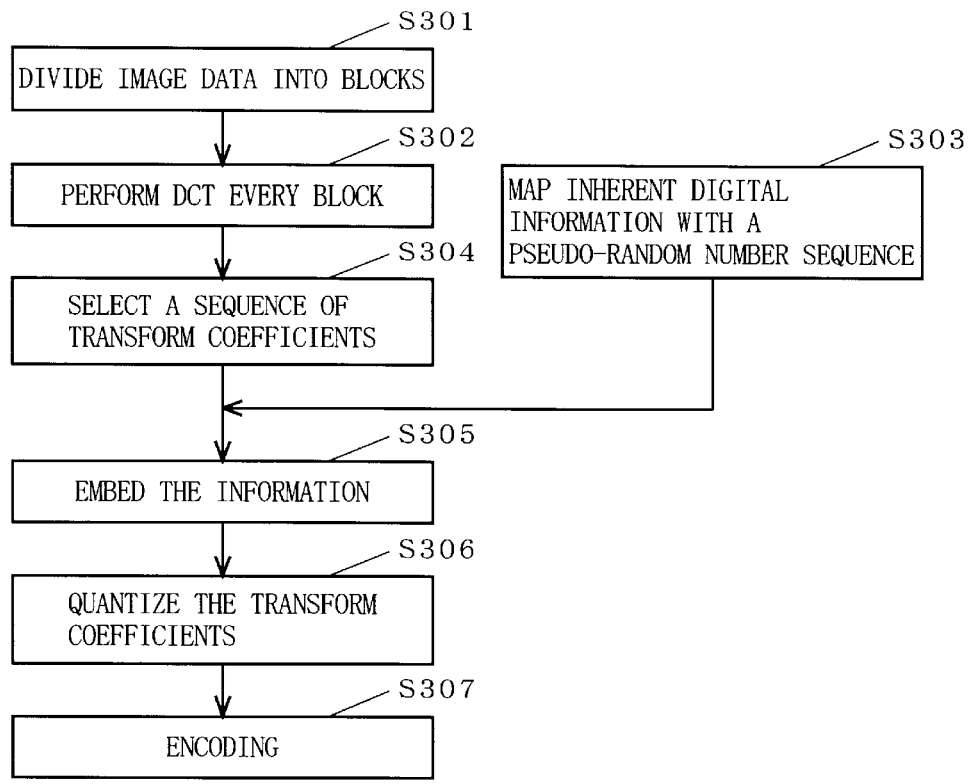

ZONE 1 : i + j = 2
ZONE 2 : i + j = 3
ZONE 3 : i + j = 4

| j= | 0 | 1 | 2 | 3 | 4 | 5 | 6 | 7 |
|---|---|---|---|---|---|---|---|---|
| i=0 | 8 | 16 | 19 | 22 | 26 | 27 | 29 | 34 |
| 1 | 16 | 19 | 22 | 26 | 27 | 29 | 34 | 37 |
| 2 | 19 | 22 | 26 | 27 | 29 | 34 | 37 | 38 |
| 3 | 22 | 26 | 27 | 29 | 34 | 37 | 38 | 40 |
| 4 | 26 | 27 | 29 | 34 | 37 | 38 | 40 | 48 |
| 5 | 27 | 29 | 34 | 37 | 38 | 40 | 48 | 58 |
| 6 | 29 | 34 | 37 | 38 | 40 | 48 | 58 | 69 |
| 7 | 34 | 37 | 38 | 40 | 48 | 58 | 69 | 83 |

| j= | 0 | 1 | 2 | 3 | 4 | 5 | 6 | 7 |
|---|---|---|---|---|---|---|---|---|
| i=0 | 8 | 16 | 19 | 22 | 26 | 27 | 29 | 34 |
| 1 | 16 | 16 | 22 | 24 | 27 | 29 | 34 | 37 |
| 2 | 19 | 22 | 26 | 27 | 29 | 34 | 34 | 38 |
| 3 | 22 | 22 | 26 | 27 | 29 | 34 | 37 | 40 |
| 4 | 22 | 26 | 27 | 29 | 32 | 35 | 40 | 48 |
| 5 | 26 | 27 | 29 | 32 | 35 | 40 | 48 | 58 |
| 6 | 26 | 27 | 29 | 34 | 38 | 46 | 56 | 69 |
| 7 | 27 | 29 | 35 | 38 | 46 | 56 | 69 | 83 |

DIGITAL INFORMATION EMBEDDING/EXTRACTING APPARATUS AND METHOD, AND MEDIUM INCLUDING A PROGRAM FOR EXECUTING THE METHOD RECORDED THEREON

BACKGROUND OF THE INVENTION

1. Field of the Invention

The present invention relates to a digital information embedding/extracting apparatus and method, and a medium including a program for executing the method recorded thereon. More particularly, the present invention relates to an apparatus and method for embedding digital data such as copyright information (hereinafter, generically called digital information) in a digital image signal and extracting the digital information from the digital image signal, and a medium including a program for executing the method recorded thereon.

2. Description of the Background Art

In recent years, it has become increasingly popular to provide information via the Internet. In particular, World-Wide Web (WWW) has been frequently used as an information send/receive service system that integrates images, sound, and the like. Once digital information such as images is made public on a network of the Internet, however, it can be easily copied by an indefinite number of users. This raises troubles such as that a third party illegally copies a copyrighted image without permission of the copyright holder and enjoys secondary use. Illegal copying is also a problem for the deployment of business on the Internet using image-base contents. To take measures against illegal copying, it is demanded to establish technology for protecting copyrights of image signals.

As one of the measures against illegal copying, a digital watermark technique is conventionally known, in which digital information is embedded in image data in a form unperceivable to humans. Using this digital watermark technique, if copyrighted digital information is illegally used, the copyright holder can claim the copyright by extracting embedded digital information and verifying the right.

An example of the conventional digital watermark embedding and extracting method is disclosed in Japanese Laid-Open Patent Publication No. 10-191330 (1998-191330) which will be briefly described as follows.

First, the digital watermark embedding method will be described with reference to FIG. 12.

Data of an original image 1101 is picked up every block 1102 of 8×8 pixels based on normal JPEG or MPEG compression. A discrete cosine transform (DCT) operator 1103 a performs DCT operation for the retrieved data so as to transform the data into frequency components. A quantizer 1104 quantizes the data outputted from the DCT operator 1103 by referring to a quantization table 1105. A watermark data embedding unit 1107 embeds watermark data 1106 in the data that is outputted from the quantizer 1104. Specifically, the watermark data that is outputted from the quantizer 1104. Specifically, the watermark data embedding unit 1107 performs processing which is represented by expression (1) below so as to obtain a new frequency component F(i) including the watermark data 1106 embedded therein.

$$F(i)=f(i)+\text{avg}(f(i)) \times w(i) \times \text{constant} \quad (1)$$

wherein i denotes the element number of a frequency component of the 8×8 pixel block 1002, w(i) denotes the value of each element of the watermark data 1106, and avg(f(i)) denotes the average of the absolutes (absolutes values) of three neighboring points of each element, that is, $\text{avg}(f(i))=(|f(i-1)|+|f(i)|+|f(i+1)|)/3$.

The watermark data embedding unit 1107 includes: a partial average calculator 1108 for calculating the average avg(f(i)) of the absolutes (absolute values) of three neighboring points of the data outputted from the quantizer 1104; a multiplier 1110 for multiplying the output of the partial average calculator 1108 by the watermark data 1106 for each element; a multiplier 1111 for multiplying the output of the multiplier 1110 by a constant α (scaling parameter) 1109 that is used for changing the size of the watermark data 1106 to be embedded for each element; and an adder 1112 for adding the output of the multiplier 1111 to the output of the quantizer 1104 for each element.

An encoder 1113 encodes the frequency component F(i) outputted from the watermark data embedding unit 1107 based on JPEG or MPEG to generate compressed data 1114 including the watermark data embedded therein.

Next, the watermark extracting method will be described with reference to FIG. 13.

Compressed data 1201 is decoded by a decoder 1202. The decoded data is subjected to inverse-quantization by an inverse-quantizer 1203 and then inverse-DCT operation by an inverse-DCT operator 1204 according to normal JPEG or MPEG decoding, to provide reproduced image data 1205.

A watermark data extractor 1206 retrieves each element from the data that is decoded by the decoder 1202, and calculates F(i)/avg(F(i)) so as t extract data that is presumed to be embedded watermark data, wherein F(i) denotes a decoded frequency component of an 8×8 pixel block and avg(F(i)) denotes the partial average of three neighboring points of the data of each 8×8 pixel block outputted from the decoder 1202, that is, $\text{avg}(F(i))=(|f(i-1)|+|f(i)|+|f(i+1)|)/3$.

The watermark data extractor 1206 includes: a partial average calculator 1207 for calculating the partial average avg(F(i)) of three neighboring points of the data; and a divider 1208 for dividing the frequency component F(i) outputted from the decoder 1202 by the partial average avg(F(i)) outputted from the partial average calculator 1207.

An adder 1209 accumulates the extracted data for each 8×8 pixel block outputted from the watermark data extractor 1206 to obtain the sum of extracted data of one screen. Once the sum of extracted data of one screen is obtained, an inner product calculator 1210 calculates an inner product between watermark data 1211 expected to be detected and the sum of extracted data, and outputs a statistical similarity 1212.

The statistical similarity 1212 is calculated in the following manner. First, watermark data W(i) is calculated from W(i)=F(i)/avg(F(i)), and then the sum WF(i) of the watermark data W(i) of one screen is calculated for each element i. The statistical similarity C between the watermark data w(i) expected to be detected and the sum WF(i) is calculated from C=WF×w/(WFD×wD) using an inner product of vectors, wherein W=(WF(1), WF(2), ..., WF(n)), w=(w(1), w(2), ..., w(n)), WFD denotes the absolute of vector WF, and wD denotes the absolute of vector w.

When the statistical similarity 1212 exceeds a predetermined value, it is determined that watermark data equivalent to the watermark data 1211 has been embedded in the compressed data 1201. In this case, if the watermark data 1211 is data indicating "duplication prohibited", for example, a reproduction machine that incorporates this watermark data extracting scheme can take some measures against duplication of the reproduced image data 1205, for example.

The above conventional technique has the following problems. During the extraction of watermark data, the frequency component F(i) must be divided by the partial average avg(F(i)) for each element of an 8×8 pixel block. This complicates the operation.

Moreover, during the embedding of watermark data, since the constant α used for changing the size of the watermark data is fixed, embedding depending on each frequency component of the 8×8 pixel block is not possible. Therefore, if the value of the constant α is increased to improve the rate of detection of watermark data, the image quality is deteriorated.

SUMMARY OF THE INVENTION

Therefore, a main object of the present invention is to provide a digital information embedding/extracting apparatus and method where the construction and operation are simpler, the calculation cost is lower, and moreover deterioration in image quality is less observable, compared with conventional ones, by using a frequency component-dependent weight sequence for each element of a transform coefficient during embedding of watermark data and calculating an inner product between a transform coefficients sequence and a pseudo-random number sequence during extraction of watermark data, and a medium including a program for executing the method recorded thereon.

Another object of the present invention is to provide a digital information embedding/extracting apparatus and method capable of removing only desired digital information from compressed data including a plurality of digital information embedded therein, and a medium including a program for executing the method recorded thereon.

The present invention has the following features to attain the object above.

A first aspect of the present invention is directed to a digital information embedding apparatus for embedding inherent digital information in a digital image signal, comprising:

a transform coefficient calculation section for decomposing the digital image signal into frequency components and calculating transform coefficients for a plurality of blocks each composed of a predetermined number of pixels;

a mapping section for mapping the inherent digital information with a pseudo-random number sequence;

an information embedding section for selecting a specific transform coefficients sequence from the transform coefficients calculated in the transform coefficient calculation section and embedding the pseudo-random number sequence in the specific transform coefficients sequence based on a predetermined weight sequence corresponding to elements of the transform coefficients, for each of said blocks;

a quantization section for quantizing the embedding-processed transform coefficients; and an encoding section for encoding the quantized transform coefficients.

A second aspect of the present invention is directed to a digital information embedding apparatus for embedding inherent digital information in a digital image signal, comprising:

a transform coefficient calculation section for decomposing the digital image signal into frequency components and calculating transform coefficients for a plurality of blocks each composed of a predetermined number of pixels;

a quantization section for quantizing the transform coefficients outputted from the transform coefficient calculation section;

a mapping section for mapping the inherent digital information with a pseudo-random number sequence;

an information embedding section for selecting a specific transform coefficients sequence from the quantized transform coefficients and embedding the pseudo-random number sequence in the specific transform coefficients sequence based on a predetermined weight sequence corresponding to elements of the transform coefficients, for each of said blocks; and an encoding section for encoding the embedding-processed transform coefficients.

The weight sequence used in the above aspects is preferably set so that as a frequency component of a transform coefficient outputted from the transform coefficient calculation section shifts in frequency from low to high, a value of the corresponding element of the weight sequence is greater.

Also preferably, a quantization table used for encoding of the digital image signal is used for the weight sequence.

Alternatively, the weight sequence may be set dynamically depending on a value of a DC component, or an average of specific AC components, of the transform coefficient outputted from the transform coefficient calculation section for each of the blocks.

Preferably, the information embedding section comprises:

an absolute calculator for calculating an absolute (absolute value) of each element of the specific transform coefficients sequence selected from the transform coefficients outputted from the transform coefficient calculation section;

a first multiplier for multiplying the absolute of each element outputted from the absolute calculator by a first set value;

a second multiplier for multiplying each element of the weight sequence by a second set value;

a first adder for adding an output of the second multiplier to an output of the first multiplier for each element;

a third multiplier for multiplying an output of the first adder by the pseudo-random number sequence for each element; and a second adder for adding an output of the third multiplier to the output of the transform coefficient calculation section for each element.

The transform coefficient calculation section in the above aspects may perform any of discrete cosine transform, Fourier transform, Hadamard transform, discrete wavelet transform, and sub-band division.

As described above, in the first and second aspects, an original image is transformed into frequency components for each block of a predetermined size, and a pseudo-random number sequence associated with inherent digital information is embedded in the resultant transform coefficients sequence using a weight sequence of which each element corresponds to each element of the transform coefficients sequence. Therefore, embedding of inherent digital information can be realized with simple construction and operation. In addition, it is substantially difficult for the third party who is informed of neither the order and length of the transform coefficients sequence for which embedding is made nor the pseudo-random number sequence to be embedded to decipher the inherent digital information. Moreover, since the pseudo-random number sequence associated with the inherent digital information, not the inherent digital information itself, is embedded, quality deterioration of the compressed data due to the embedding is less observable. If a quantization table used for encoding of digital image signals is used for the weight sequence, deterioration in image quality can be suppressed.

A third aspect of the present invention is directed to a digital information extracting apparatus for extracting inherent digital information embedded in a specific transform coefficients sequence among transform coefficients calculated by decomposing a digital image signal into frequency components by a specific apparatus, comprising:

a decoding section for receiving compressed data encoded and outputted by the specific apparatus and decoding the compressed data;

an inverse-quantization section for performing inverse quantization for data outputted from the decoding section;

a correlation value calculation section for calculating an inner product between the specific transform coefficients sequence among data outputted from the inverse-quantization section and each of a plurality of pseudo-random number sequences including a pseudo-random number sequence associated with the inherent digital information embedded by the specific apparatus;

a pseudo-random number sequence determination section for determining a pseudo-random number sequence embedded in the data based on a value of the inner product outputted from the correlation value calculation section; and an information generation section for generating inherent digital information mapped with the determined pseudo-random number sequence.

A fourth aspect of the present invention is directed to a digital information extracting apparatus for extracting inherent digital information embedded in a specific quantized transform coefficients sequence among transform coefficients calculated by decomposing a digital image signal into frequency components by a specific apparatus, comprising:

a decoding section for receiving compressed data encoded and outputted by the specific apparatus and decoding the compressed data;

a correlation value calculation section for calculating an inner product between the specific quantized transform coefficients sequence among data outputted from the decoding section and each of a plurality of pseudo-random number sequences including a pseudo-random number sequence associated with the inherent digital information embedded by the specific apparatus;

a pseudo-random number sequence determination section for determining a pseudo-random number sequence embedded in the data based on a value of the inner product outputted from the correlation value calculation section; and an information generation section for generating inherent digital information mapped with the determined pseudo-random number sequence.

As described above, in the third and fourth aspects, compressed data including a pseudo-random number sequence embedded therein is decoded, and a correlation value is obtained by calculating an inner product between the transform coefficients sequence and the pseudo-random number sequence. The correlation value is compared with a predetermined threshold value, to specify the embedded pseudo-random number sequence and thus generate the inherent digital information. Therefore, extraction of the inherent digital information can be realized with simple construction and operation. In addition, it is substantially difficult for the third party who is informed of neither the order and length of the transform coefficients sequence for which embedding is made nor the pseudo-random number sequence to be embedded to decipher the inherent digital information. Moreover, since the pseudo-random number sequence associated with the inherent digital information, not the inherent digital information itself, has been embedded, the rate of detection of watermark data can be improved.

A fifth aspect of the present invention is directed to a digital information embedding apparatus for removing only desired digital information among a plurality of digital information embedded in a specific transform coefficients sequence calculated by decomposing a digital image signal into frequency components by a specific apparatus based on a weight sequence, comprising:

a decoding section for receiving compressed data encoded and outputted by the specific apparatus and decoding the compressed data;

an inverse-quantization section for performing inverse quantization for data outputted from the decoding section;

a mapping section for mapping the desired digital information with a pseudo-random number sequence;

an information embedding section for selecting a specific transform coefficients sequence in which the desired digital information has been embedded from data outputted from the inverse-quantization section, and embedding the pseudo-random number sequence in the specific transform coefficients sequence;

a quantization section for quantizing the embedding-processed transform coefficients; and an encoding section for encoding the quantized transform coefficients.

A sixth aspect of the present invention is directed to a digital information embedding apparatus for removing only desired digital information among a plurality of digital information embedded in a specific quantized transform coefficients sequence calculated by decomposing a digital image signal into frequency components by a specific apparatus based on a weight sequence, comprising:

a decoding section for receiving compressed data encoded and outputted by the specific apparatus and decoding the compressed data;

a mapping section for mapping the desired digital information with a pseudo-random number sequence;

an information embedding section for selecting a specific quantized transform coefficients sequence in which the desired digital information has been embedded from data outputted from the decoding section, and embedding the pseudo-random number sequence in the specific transform coefficients sequence; and an encoding section for encoding the embedding-performed transform coefficients.

Preferably, the information embedding section comprises:

an absolute calculator for calculating an absolute of each element of the specific transform coefficients sequence selected from data outputted from the inverse-quantization section;

a first multiplier for multiplying the absolute of each element outputted from the absolute calculator by a first set value;

a second multiplier for multiplying each element of the weight sequence used by the specific apparatus by a second set value;

an adder for adding an output of the second multiplier to an output of the first multiplier for each element;

a third multiplier for multiplying an output of the adder by the pseudo-random number sequence for each element; and a subtracter for subtracting an output of the third multiplier from the output of the inverse-quantization section.

Alternatively, the information embedding section comprises:

an absolute calculator for calculating an absolute of each element of the specified transform coefficients sequence selected from data outputted from the inverse-quantization section;

a first multiplier for multiplying the absolute of each element outputted from the absolute calculator by a first set value;

a second multiplier for multiplying an output of the first multiplier by the pseudo-random number sequence for each element; and a subtracter for subtracting an output of the second multiplier from the output of the inverse-quantization section.

As described above, in the fifth and sixth aspects, only a given pseudo-random number sequence is subtracted from a plurality of pseudo-random number sequences embedded. Thus, it is possible to remove only desired digital information from compressed data including a plurality of digital information embedded therein without causing deterioration in image quality. For example, this processing is useful when it is desired to remove unnecessary author information among a plurality of author information embedded in compressed data.

A seventh aspect of the present invention is directed to a digital information embedding method for embedding inherent digital information in a digital image signal, comprising the steps of:

decomposing the digital image signal into frequency components and calculating transform coefficients for a plurality of blocks each composed of a predetermined number of pixels;

mapping the inherent digital information with a pseudo-random number sequence;

selecting a specific transform coefficients sequence from the calculated transform coefficients, and embedding the pseudo-random number sequence in the specific transform coefficients sequence based on a predetermined weight sequence corresponding to elements of the transform coefficients, for each of said blocks;

quantizing the embedding-processed transform coefficients; and encoding the quantized transform coefficients.

An eighth aspect of the present invention is directed to a digital information embedding method for embedding inherent digital information in a digital image signal, comprising the steps of:

decomposing the digital image signal into frequency components and calculating transform coefficients for a plurality of blocks each composed of a predetermined number of pixels;

quantizing the calculated transform coefficients;

mapping the inherent digital information with a pseudo-random number sequence;

selecting a specific transform coefficients sequence from the quantized transform coefficients, and embedding the pseudo-random number sequence in the specific transform coefficients sequence based on a predetermined weight sequence corresponding to elements of the transform coefficients, for each of said blocks; and encoding the embedding-processed transform coefficients.

A ninth aspect of the present invention is directed to a digital information extracting method for extracting inherent digital information embedded in a specific transform coefficients sequence among transform coefficients calculated by decomposing a digital image signal into frequency components by a specific apparatus, the method comprising the steps of:

receiving compressed data encoded and outputted by the specific apparatus and decoding the compressed data;

performing inverse quantization for the decoded data;

calculating an inner product between the specific transform coefficients sequence among the inverse-quantized data and each of a plurality of pseudo-random number sequences including a pseudo-random number sequence associated with the inherent digital information embedded by the specific apparatus;

determining a pseudo-random number sequence embedded in the data based on a calculated value of the inner product; and generating inherent digital information mapped with the determined pseudo-random number sequence.

A tenth aspect of the present invention is directed to a digital information extracting method for extracting inherent digital information embedded in a specific quantized transform coefficients sequence among transform coefficients calculated by decomposing a digital image signal into frequency components by a specific apparatus, the method comprising the steps of:

receiving compressed data encoded and outputted by the specific apparatus and decoding the compressed data;

calculating an inner product between the specific quantized transform coefficients sequence among the decoded data and each of a plurality of pseudo-random number sequences including a pseudo-random number sequence associated with the inherent digital information embedded by the specific apparatus;

determining a pseudo-random number sequence embedded in the data based on a calculated value of the inner product; and generating inherent digital information mapped with the determined pseudo-random number sequence.

The step of determining a pseudo-random number sequence in the ninth and tenth aspects preferably includes determining a pseudo-random number sequence providing an inner product greater than a predetermined threshold value as the embedded pseudo-random number sequence.

An eleventh aspect of the present invention is directed to a digital information embedding method for removing only desired digital information among a plurality of digital information embedded in a specific transform coefficients sequence calculated by decomposing a digital image signal into frequency components by a specific apparatus, the method comprising the steps of:

receiving compressed data encoded and outputted by the specific apparatus and decoding the compressed data;

performing inverse quantization for the decoded data;

mapping the desired digital information with a pseudo-random number sequence;

selecting a specific transform coefficients sequence in which the desired digital information has been embedded from the inverse-quantized data, and embedding the pseudo-random number sequence in the specific transform coefficients sequence;

quantizing the embedding-processed transform coefficients; and encoding the quantized transform coefficients.

A twelfth aspect of the present invention is directed to a digital information embedding method for removing only desired digital information among a plurality of digital information embedded in a specific quantized transform coefficients sequence calculated by decomposing a digital image signal into frequency components by a specific apparatus, the method comprising the steps of:

receiving compressed data encoded and outputted by the specific apparatus and decoding the compressed data;

mapping the desired digital information with a pseudo-random number sequence;

selecting a specific quantized transform coefficients sequence in which the desired digital information has been embedded from the decoded data, and embedding the pseudo-random number sequence in the specific transform coefficients sequence; and encoding the embedding-processed transform coefficients.

Typically, the digital information embedding/extracting methods described in the seventh to twelfth aspects are implemented by a computer including a memory that stores predetermined program data programmed to realize the steps described above and a CPU executing the program data. The predetermined program data programmed to realize the steps described in the seventh to twelfth aspects may be installed on the computer via a recording medium that can write the program data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart of processing performed by the digital information embedding apparatus 1A of FIG. 1.

FIG. 4 is a view showing an example of an association table of inherent digital information with pseudo-random number sequences held in a mapping section 12 in FIG. 1.

DESCRIPTION OF THE PREFERRED EMBODIMENTS

First Embodiment

Figure 1:
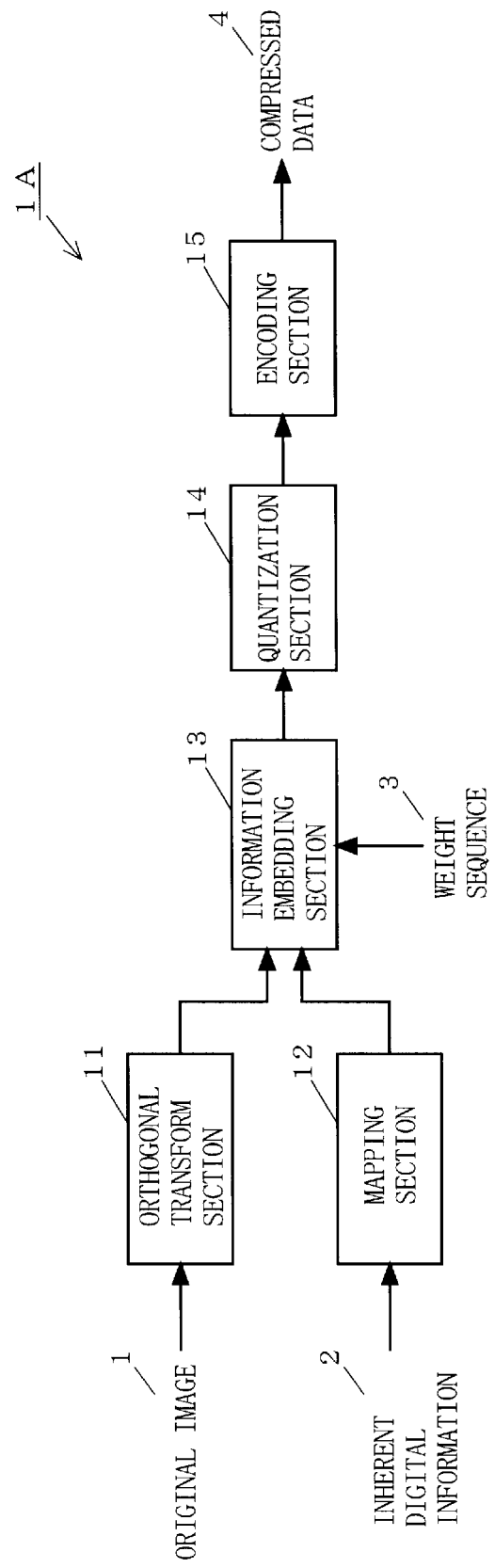
FIG. 1 is a block diagram of a digital information embedding apparatus 1A of a first embodiment of the present invention.
Figure 2:
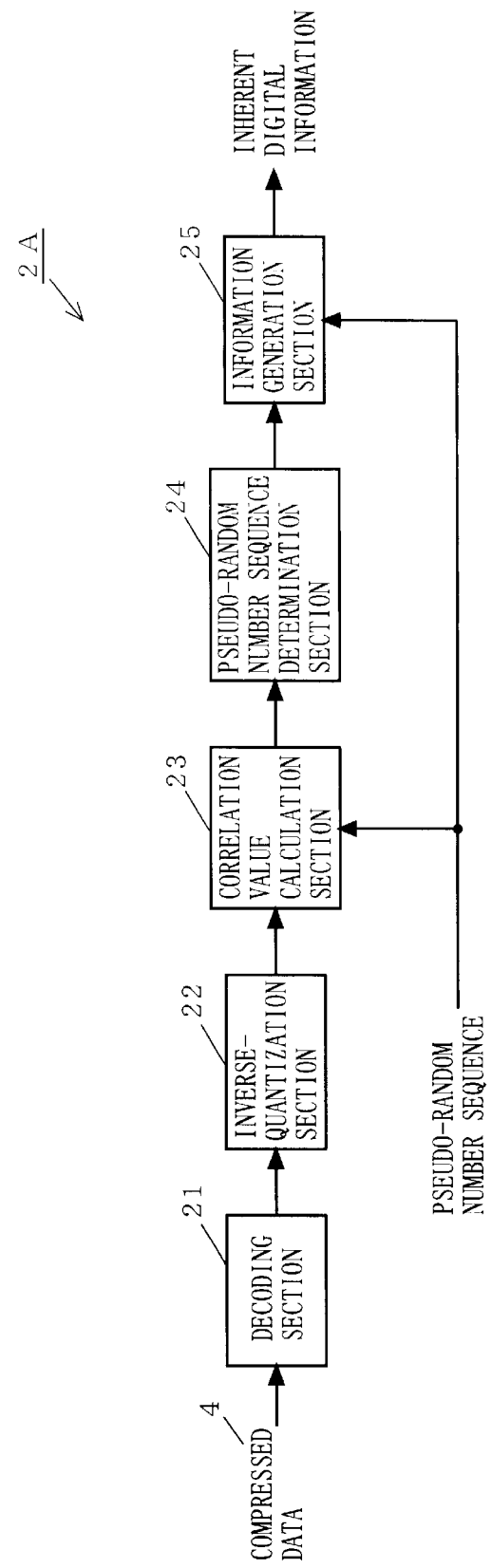
FIG. 2 is a block diagram of a digital information extracting apparatus 2A of the first embodiment of the present invention.

FIGS. 1 and 2 are block diagrams of a digital information embedding apparatus 1A and a digital information extracting apparatus 2A, respectively, of the first embodiment of the present invention.

Referring to FIG. 1, the digital information embedding apparatus 1A of this embodiment includes an orthogonal transform section 11, a mapping section 12, an information embedding section 13, a quantization section 14, and an encoding section 15. Referring to FIG. 2, the digital information extracting apparatus 2A of this embodiment includes a decoding section 21, an inverse-quantization section 22, a correlation value calculation section 23, a pseudo-random number sequence determination section 24, and an information generation section 25.

Hereinafter, with additional reference to FIGS. 3 through 8, a digital information embedding method and a digital information extracting method performed by the digital information embedding/extracting apparatus of the first embodiment of the present invention will be described in sequence.

First, referring to FIGS. 1 and 3 through 7, the digital information embedding method performed by the digital information embedding apparatus 1A will be described. FIG. 3 is a flowchart of processing performed by the digital information embedding apparatus 1A of FIG. 1.

Referring to FIG. 3, the orthogonal transform section 11 receives an original image 1 and divides the original image 1 into a plurality of blocks each composed of a predetermined number of pixels (step S301). The orthogonal transform section 11 performs orthogonal transform for each block to decompose the original image 1 into frequency components and calculate transform coefficients (step S302). In this embodiment, as an example, the original image 1 is divided into M blocks each composed of 8×8 pixels, and discrete cosine transform (DCT) is performed for each block as the orthogonal transform.

The mapping section 12 determines a given pseudo-random number sequence, which is associated with inherent digital information 2 that is to be embedded in the original image 1, by referring to an association table (step S303). FIG. 4 illustrates an example of the association table that associates digital information with pseudo-random number sequences, which is held in advance in the mapping section 12. For example, when the inherent digital information 2 is author information composed of the author's name and the date of preparation, the author information and a pseudo-random number sequence are entered as one set in the association table where any pseudo-random number sequence appears only once. The pseudo-random number sequence is generated by random selection from a population constructed of a normal (Gaussian) distribution having an average value of 0 and a variance of 1 or a maximum length shift register sequence (M sequence). The length of the pseudo-random number sequence can be determined arbitrarily depending on the original image to be processed, the desired embedding level, and the like. A plurality of pseudo-random number sequences may be set for one author information.

Upon receipt of the inherent digital information 2 to be embedded in the original image 1, such as author information $A_1$, for example, the mapping section 12 refers to the association table and outputs a pseudo-random number sequence $W_1$ to the information embedding section 13.

Figure 5:
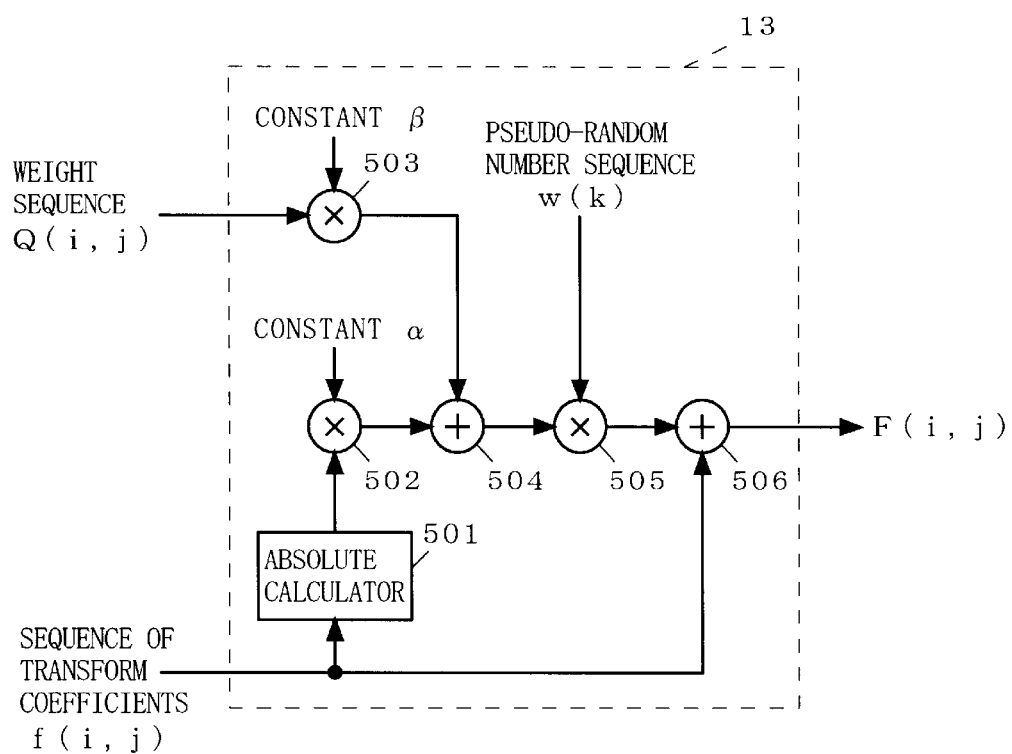
FIG. 5 is a block diagram illustrating in detail an example of an information embedding section 13 in FIG. 1.
Figures 6, 7A, 7B:
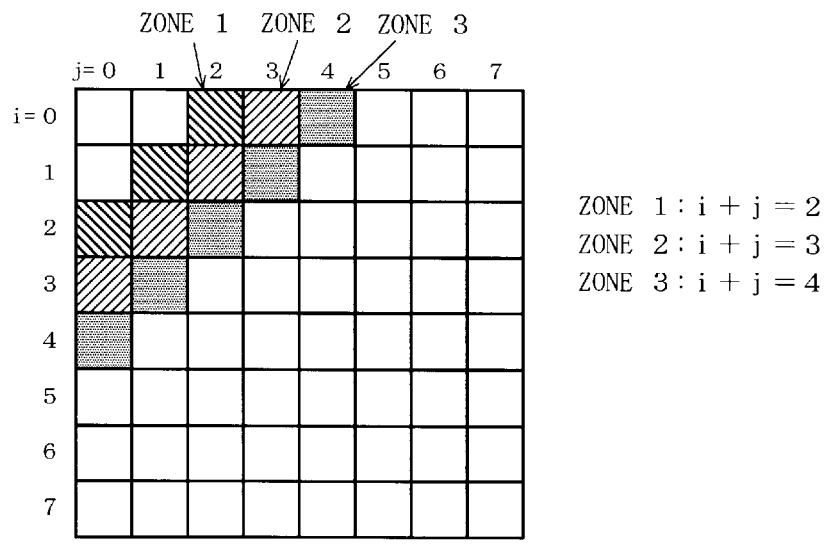
FIG. 6 is a view showing element numbers of frequency components of an 8×8 pixel block.
FIGS. 7A and 7B are views showing quantization tables used in MPEG.

Referring to FIGS. 5 through 7, processing performed by the information embedding section 13 will be described. FIG. 5 is a detailed block diagram of the information embedding section 13.

The information embedding section 13 selects transform coefficients of specific frequency components among the transform coefficients calculated in the orthogonal transform section 11 as a transform coefficients sequence f(i,j) for each of M blocks (step S304). The information embedding section 13 then calculates a sequence of transform coefficient F(i,j) by embedding a pseudo-random number sequence w(k) associated with the inherent digital information 2 in each transform coefficients sequence f(i,j) using a given weight sequence Q(i,j) (step S305).

As shown in FIG. 5, the information embedding section 13 includes: an absolute calculator 501 for calculating the absolute of each element of the selected transform coefficients sequence f(i,j); a multiplier 502 for multiplying the output of the absolute calculator 501 by a constant α (scaling parameter used for changing the size of the data to be embedded) for each element; a multiplier 503 for multiplying each element of the weight sequence Q(i,j) by a constant β (scaling parameter used for changing the weight of the pseudo-random number sequence to be embedded); an adder 504 for adding the output of the multiplier 503 to the output of the multiplier 502 for each element; a multiplier 505 for multiplying the output of the adder 504 by the pseudo-random number sequence w(k) for each element; and an adder 506 for adding the output of the multiplier 505 to the transform coefficients sequence f(i,j) for each element.

That is, in the information embedding section 13, expression (2) below is calculated to obtain the transform coefficients sequence F(i,j).

$$F(i,j) = f(i,j) + (\alpha|f(i,j)| + \beta Q(i,j))w(k) \qquad (2)$$

wherein i and j each denote the element number of a frequency component of a block as shown in FIG. 6, and k denotes the element number constituting the pseudo-random number sequence and the number of elements is preferably equal to or more than the number of blocks M of the original image 1.

As the transform coefficients sequence f(i,j), selected most preferably are transform coefficients of which the added value of i and j is constant. For example, as a transform coefficients sequence (zone 1) giving i+j=2, three transform coefficients f(0,2), f(1,1), and f(2,0) are selected from the block. If it is desired to embed the pseudo-random number sequence w(k) in a plurality of sequences of transform coefficients (for example, all of zones 1 to 3), expression (2) above may be calculated for each transform coefficients sequence f(i,j). In this case, the same pseudo-random number sequence may be embedded in the plurality of sequences of transform coefficients in a serial or parallel manner, or different pseudo-random number sequences may be embedded. In consideration of image deterioration after embedding, it is desirable to embed a pseudo-random number sequence only in a transform coefficient of which value is not zero.

The transform coefficients selected as the transform coefficients sequence f(i,j) are not limited to those in the positions shown in FIG. 6 (positions in which the added value of i and j is constant), but may be selected arbitrarily within the 8×8 pixel size. In this case, however, the selected positions, the order of processing, and the like must be agreed in advance between the digital information embedding apparatus 1A and the digital information extracting apparatus 2A.

The respective elements of the pseudo-random number sequence w(k) are embedded in the sequences of transform coefficients f(i,j) in a predetermined order. For example, when the pseudo-random number sequence is to be embedded in the transform coefficients sequence of zone 1 of each block as described above, w(1) is used for f(0,2) of the first block, w(2) for f(1,1) of the first block, w(3) for f(0,2) of the first block, w(4) for f(0,2) of the second block, w(5) for f(1,1) of the second block, . . . , and w(k) for f(0,2) of the M-th block. Note that the order is not necessarily ascending as in this example, as long as agreement is established between the embedding side and the extracting side.

If the total number of elements of the sequences of transform coefficients f(i,j) of all the blocks does not match with the number of elements of the pseudo-random number sequence w(k) to be embedded, the pseudo-random number sequence may be repeated or contracted to complete the embedding.

The weight sequence Q(i,j) is constructed of elements each corresponding to the transform coefficient for each frequency component of a block. Each element of the weight sequence Q(i,j) is preferably set so that the value is greater as the value of i or j is greater, as shown in FIG. 7A, for example. In other words, preferably, as the frequency component of the transform coefficient outputted from the orthogonal transform section 11 shifts in frequency from low to high, the value of the corresponding element of the weight sequence is greater. This setting of a greater value for the transform coefficient of a higher-frequency component is based on a nature of the vision of humans that "a change of an image is less observable in a high-frequency component than in a low-frequency component."

The method for embedding and extracting digital information of the present invention is applicable, not only to still image signals, but also to moving image signals. When the inventive method is applied to moving image signals, values in a quantization table used in MPEG image coding, for example, may be used as the weight sequence Q(i,j) (FIG. 7B). This serves to reduce the image deterioration due to the embedding.

Alternatively, the weight sequence Q(i,j) used for each block may be dynamically changed depending on the value of a DC component (f(0,0)) of the transform coefficient calculated in the orthogonal transform section 11. This change of the weight sequence Q(i,j) may be done by adding the DC component value to the weight sequence Q(i,j) or multiplying the weight sequence Q(i,j) by the DC component value, or by selecting one among a plurality of weight sequences Q(i,j) having different values prepared in advance depending on the DC component value. In either case, by changing the weight sequence Q(i,j) depending on the DC component value, it is possible to increase the weight for a monotonous image (totally white or totally black image), of which visual change is less recognizable, during the embedding of the pseudo-random number sequence.

Alternatively, the weight sequence Q(i,j) used for each block may be dynamically changed depending on the value of an AC component of the transform coefficient (any transform coefficient other than the DC component) calculated in the orthogonal transform section 11. In this case, also, as described above, change of the weight sequence Q(i,j) can be realized by adding or multiplying the AC component value or by selecting a weight sequence. As the AC component value, an average of all the transform coefficients other than f(0,0), an average of only the transform coefficients to be embedded, and the like may be used. In this way, by changing the weight sequence Q(i,j) depending on the AC component value, it is possible to increase the weight for a complicate image including a number of high-frequency components, of which visual change is less recognizable, during the embedding of the pseudo-random number sequence.

Referring to FIG. 3 again, the quantization section 14 quantizes the information-embedded transform coefficients (step S306). The encoding section 15 encodes the quantized transform coefficients, to generate the compressed data 4 including the pseudo-random number sequence associated with the inherent digital information embedded therein (step S307).

Thus, embedding of the inherent digital information in the original image 1 is completed.

Figure 8:
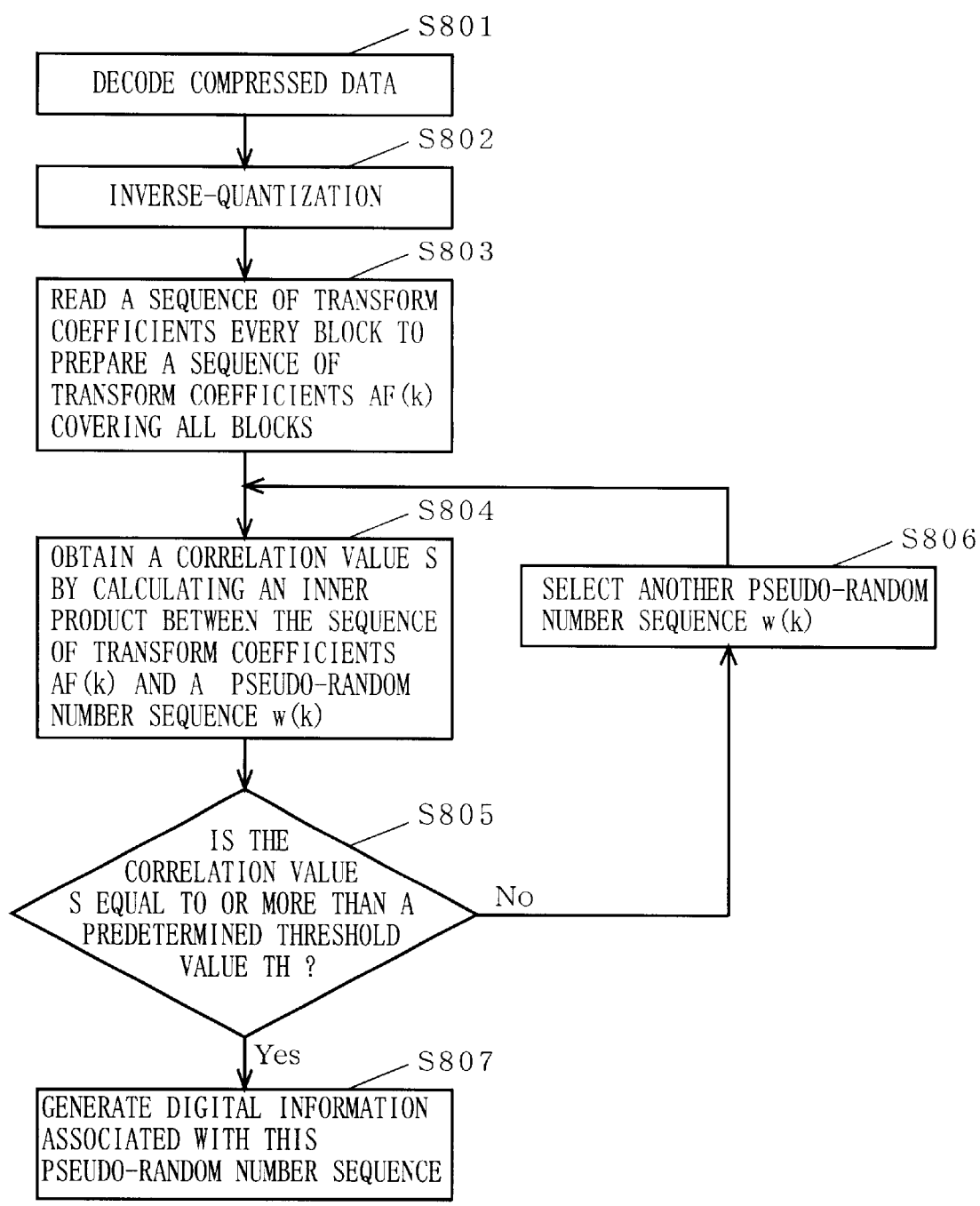
FIG. 8 is a flowchart of processing performed by the digital information extracting apparatus 2A of FIG. 2.

Next, the digital information extracting method performed by the digital information extracting apparatus 2A will be described with reference to FIGS. 2 and 8. FIG. 8 is a flowchart of processing performed by the digital information extracting apparatus 2A of FIG. 2.

Referring to FIG. 8, the decoding section 21 receives the compressed data 4 outputted from the encoding section 15 of the digital information embedding apparatus 1A described above, and decodes the data (step S801). The inverse-quantization section 22 performs inverse quantization for the data decoded by the decoding section 21 (step S802).

The correlation value calculation section 23 reads the transform coefficients sequence F(i,j) selected in the information embedding section 13 of the digital information embedding apparatus 1A among the data outputted from the inverse-quantization section 22 from the respective blocks sequentially in a predetermined order, to prepare a transform coefficients sequence AF(k) composed of the transform coefficients of all the blocks used for the embedding (step S803). The predetermined order has been agreed in advance with the digital information embedding apparatus 1A. The correlation value calculation section 23 then calculates an inner product between a pseudo-random number sequence w(k), one of candidates presumed to have been embedded in the compressed data 4, and the transform coefficients sequence AF(k) according to expression (3) below, to obtain a correlation value S (step S804).

$$S = \frac{1}{M}\sum_{k=1}^{M} AF(k) \times w(k) \tag{3}$$

The correlation value calculation section 23 is provided with the same association table (FIG. 4) as that held in the mapping section 12 of the digital information embedding apparatus 1A.

The pseudo-random number sequence determination section 24 compares the correlation value S calculated in the correlation value calculation section 23 with a predetermined threshold value TH (step S805). If the correlation value S is equal to or greater than the threshold value TH, the pseudo-random number sequence determination section 24 determines that the candidate pseudo-random number sequence w(k) has been embedded in the compressed data 4. If the correlation value S is less than the threshold value TH, the pseudo-random number sequence determination section 24 determines that the candidate pseudo-random number sequence w(k) has not been embedded in the compressed data 4. In the latter case, the pseudo-random number sequence determination section 24 repeats the same processing for another candidate pseudo-random number sequence (step S806), until the embedded pseudo-random number sequence is specified (steps S804 and S805). The threshold value TH may be set at a level at which the embedded pseudo-random number sequence can be optimally specified in consideration of disturbance (distortion during transmission, intentional tampering, and the like) that may occur for the compressed data 4 on the transmission path. The correlation value S greatly changes with the contents of an image. Therefore, the threshold value TH is preferably set dynamically based on the transform coefficients of the image obtained by the decoding (that is, the feature of the image), rather than being fixed. For example, the threshold value TH can be set dynamically according to expression (4) below.

$$TH = \frac{1}{2M}\sum_{k=1}^{M}\{\alpha|AF(k)| + \beta Q(k)\} \tag{4}$$

wherein Q(k) denotes the entire sequence of Q(i,j) corresponding to the transform coefficients sequence F(i,j) read in the predetermined order.

Note that when disturbance occurs for the compressed data 4, there may possibly exist a plurality of pseudo-random number sequences exhibiting a more or less high correlation value S. In such a case, it may simply be determined that the pseudo-random number sequence having the highest correlation value S has been embedded, or it may be determined that the pseudo-random number sequence having the highest correlation value S has been embedded only when the highest correlation value S satisfies a given ratio with respect to the other correlation value(s) S.

Once the embedded pseudo-random number sequence w(k) is specified, the information generation section 25 generates the inherent digital information mapped with the pseudo-random number sequence w(k) in the mapping section 12 of the digital information embedding apparatus 1A (step S807). This generation can be easily done by referring to the same association table as the association table (FIG. 4) held in the mapping section 12 of the digital information embedding apparatus 1A.

As described above, the digital information embedding apparatus of the first embodiment of the present invention performs orthogonal transform for an original image every 8×8 pixel block, and embeds each element of a pseudo-random number sequence associated with inherent digital information in each element of the resultant transform coefficients sequence using a weight sequence of which each element corresponds to each element of the transform coefficients sequence. The digital information extracting apparatus of the first embodiment of the present invention decodes the compressed data including the pseudo-random number sequence embedded therein, calculates a correlation value by calculating an inner product between the transform coefficients sequence and the pseudo-random number sequence, and compares the correlation value with a predetermined threshold value to thereby specify the embedded pseudo-random number sequence and thus generate the inherent digital information.

Thus, embedding and extraction of inherent digital information can be performed with simple construction and operation. Moreover, it is substantially difficult for the third party who is informed of neither the order and length of the transform coefficients sequence for which embedding is made nor the pseudo-random number sequence to be embedded to decipher the inherent digital information. Moreover, since the pseudo-random number sequence associated with the inherent digital information, not the inherent digital information itself, is embedded, quality deterioration of the compressed data due to the embedding is less observable, and also the rate of detection of watermark data improves.

In the digital information embedding apparatus 1A of this embodiment, the positions of the information embedding section 13 and the quantization section 14 may be changed with each other, to perform embedding for the quantized transform coefficients sequence. In the digital information extracting apparatus 2A of this embodiment, the processing of the inverse-quantization section 22 may be omitted, and the inner product may be calculated between the quantized transform coefficients sequence decoded by the decoding section 21 and the pseudo-random number sequence. By these procedures of embedding and extracting, also, an effect similar to the useful effect of the present invention described above can be obtained.

Second Embodiment

Figure 9:
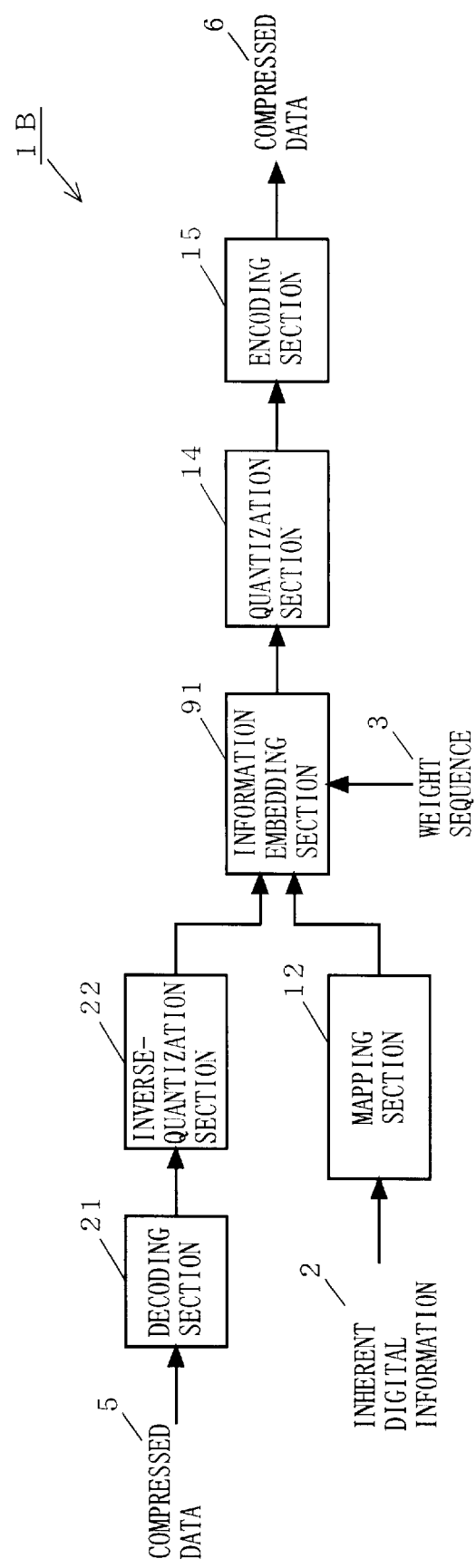
FIG. 9 is a block diagram of a digital information embedding apparatus 1B of a second embodiment of the present invention.

FIG. 9 is a block diagram of a digital information embedding apparatus 1B of the second embodiment of the present invention. Referring to FIG. 9, the digital information embedding apparatus 1B of this embodiment includes a decoding section 21, an inverse-quantization section 22, a mapping section 12, an information embedding section 91, a quantization section 14, and an encoding section 15. The decoding section 21 and the inverse-quantization section 22 are substantially the same in construction as those of the digital information extracting apparatus 2A of the first embodiment described above. The mapping section 12, the quantization section 14, and the encoding section 15 are substantially the same in construction as those of the digital information embedding apparatus 1A of the first embodiment described above. These components are therefore denoted by the same reference numerals, and the description thereof is partly omitted in this embodiment.

The decoding section 21 receives compressed data 5 and decodes the data. It is assumed herein that a plurality of inherent digital information have been embedded in the compressed data 5 by the digital information embedding apparatus 1A of the first embodiment or the like. Herein, described as an example is the case where a first pseudo-random number sequence mapped with first inherent digital information and a second pseudo-random number sequence mapped with second inherent digital information have been embedded in the compressed data 5. The inverse-quantization section 22 performs inverse-quantization for the data decoded in the decoding section 21. The mapping section 12 outputs a pseudo-random number sequence associated with desired digital information (author information) to the information embedding section 91 by referring to the association table shown in FIG. 4. Assume in this example that the second pseudo-random number sequence is outputted.

Figure 10:
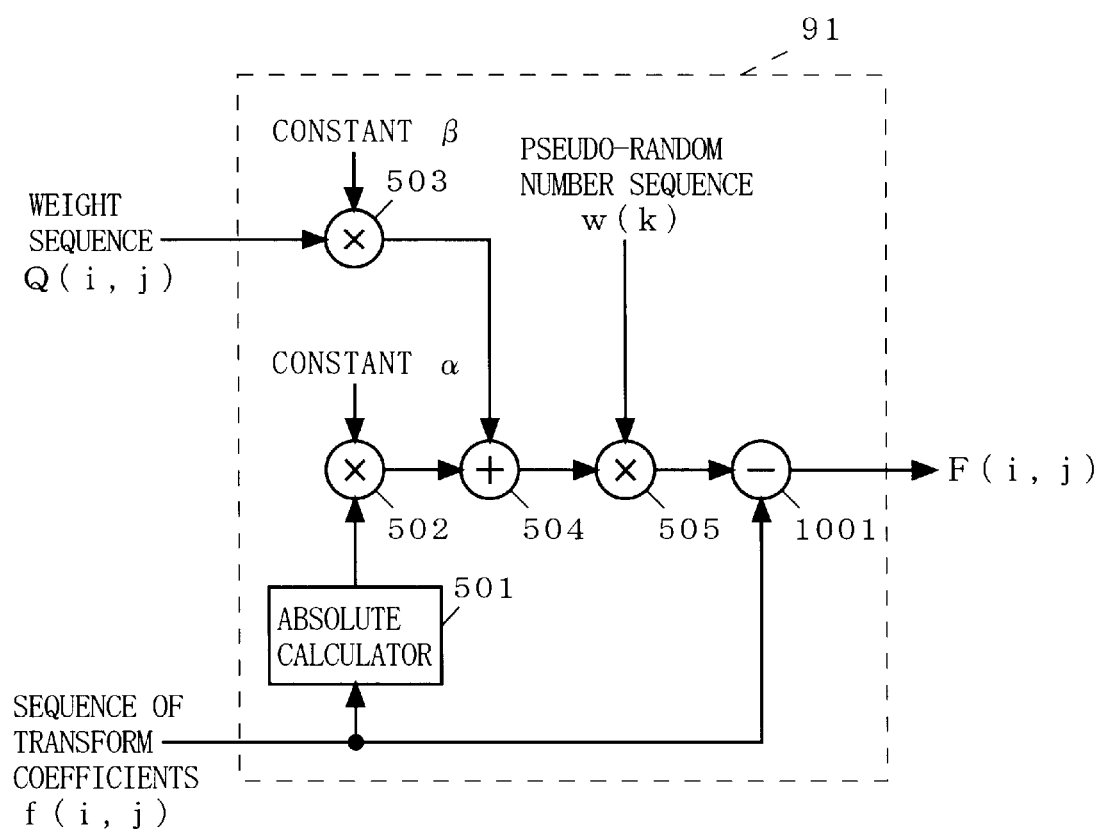
FIG. 10 is a block diagram illustrating in detail an example of an information embedding section 91 in FIG. 9.

FIG. 10 is a detailed block diagram of an example of the information embedding section 91.

The information embedding section 91 reads a transform coefficients sequence f(i,j) among the data outputted from the inverse-quantization section 22 in a predetermined order, and calculates a transform coefficients sequence F(i,j) by embedding a specific pseudo-random number sequence w(k) in a negative value in the transform coefficients sequence f(i,j) using a predetermined weight sequence Q(i,j). That is, the information embedding section 91 calculates a transform coefficients sequence F(i,j) by removing the already-embedded specific pseudo-random number sequence w(k) from the transform coefficients sequence f(i,j).

Referring to FIG. 10, the information embedding section 91 includes: an absolute calculator 501 for calculating the absolute of each read element of the transform coefficients sequence f(i,j); a multiplier 502 for multiplying the output of the absolute calculator 501 by a constant $\alpha$ (scaling parameter used for changing the size of the data to be embedded) for each element; a multiplier 503 for multiplying each element of the weight sequence Q(i,j) by a constant $\beta$ (scaling parameter used for changing the weight of the pseudo-random number sequence to be embedded); an adder 504 for adding the output of the multiplier 503 to the output of the multiplier 502 for each element; a multiplier 505 for multiplying the output of the adder 504 by the second pseudo-random number sequence w(k) outputted from the mapping section 12 for each element; and a subtracter 1001 for subtracting the output of the multiplier 505 from the transform coefficients sequence f(i,j) for each element.

Thus, in the information embedding section 91, expression (5) below is calculated so as to obtain the transform coefficients sequence F(i,j).

$$F(i,j)=f(i,j)-(\alpha|f(i,j)|+\beta Q(i,j))w(k) \qquad (5)$$

The components of the information embedding section 91 shown in FIG. 10 are the same in construction as those of the information embedding section 13 shown in FIG. 5, except for the subtracter 1001.

The quantization section 14 quantizes the transform coefficients of each block after the information embedding, that is, the transform coefficients from which the second pseudo-random number sequence w(k) has been removed, in this case. The encoding section 15 encodes the transform coefficients quantized in the quantization section 14 to generate compressed data 6 including only the first pseudo-random number sequence embedded therein.

As described above, the digital information embedding apparatus 1B of the second embodiment of the present invention performs processing (expression (5)) inverse to the embedding (expression (2)) performed by the digital information embedding apparatus 1A of the first embodiment. In other words, only a specific pseudo-random number sequence is subtracted from a plurality of pseudo-random number sequences embedded. This processing therefore makes it possible to remove only desired digital information from compressed data including a plurality of digital information embedded therein without causing quality deterioration.

For example, the embedding processing in the second embodiment described above is useful when it is desired to remove unnecessary author information among a plurality of author information embedded in compressed data.

Moreover, using a reproduction apparatus provided with both the embedding scheme of the second embodiment and the extracting scheme of the first embodiment, the following processing is possible if the embedded digital information indicates limitation of a use duration and the like. That is, during the embedding, the embedded digital information is removed from the compressed data of which the use duration has expired, so that the correlation value obtained by the inner product calculation is made smaller than the predetermined threshold value during the extraction. In this way, use of the compressed data, for example, can be prohibited. In addition, when used in this manner, it is not necessary to newly embed inherent digital information, and thus deterioration in image quality is prevented.

Expression (5) above represents processing corresponding to expression (2) that represents the embedding performed by the digital information embedding apparatus 1A of the first embodiment. Therefore, if expression (2) is changed, expression (5) may be changed so that the corresponding inverse processing is possible.

For example, if expression (2) is changed to expression (6) below for embedding digital information, expression (5) may be changed to expression (7) below. In this case, also, an effect similar to the useful effect of the second embodiment described above can be obtained.

$$F(i,j)=f(i,j)+\alpha|f(i,j)|w(k) \quad (6)$$

$$F(i,j)=f(i,j)-\alpha|f(i,j)|w(k) \quad (7)$$

In the first and second embodiments, the discrete cosine transform (DCT) was used as the orthogonal transform scheme for calculating a transform coefficient corresponding to an original image. Alternatively, other transform schemes such as Fourier transform, Hadamard transform, discrete wavelet transform, and sub-band division may be used as long as an original image can be decomposed into frequency components.

Figure 11:
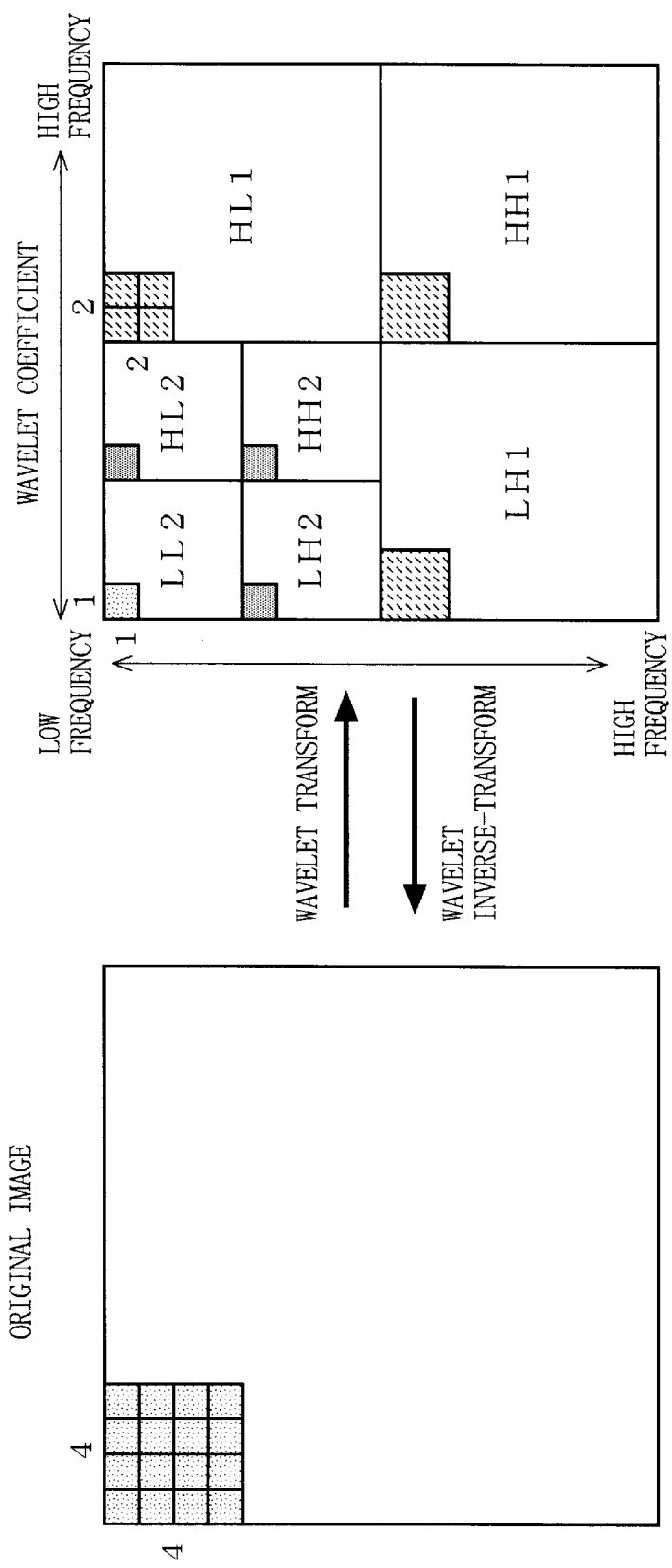
FIG. 11 is a view for describing a discrete wavelet transform which is usable as an orthogonal transform scheme.
Figure 12:
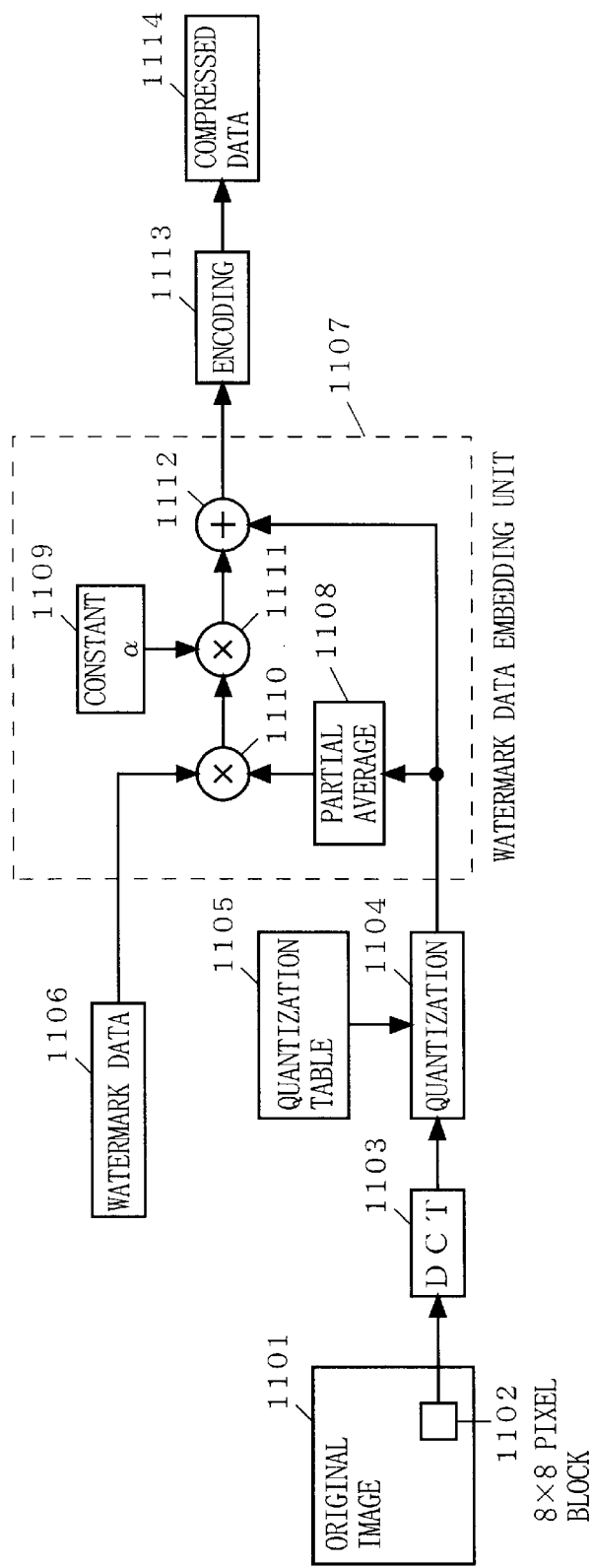
FIG. 12 is a block diagram illustrating an example of the conventional watermark embedding method.
Figure 13:
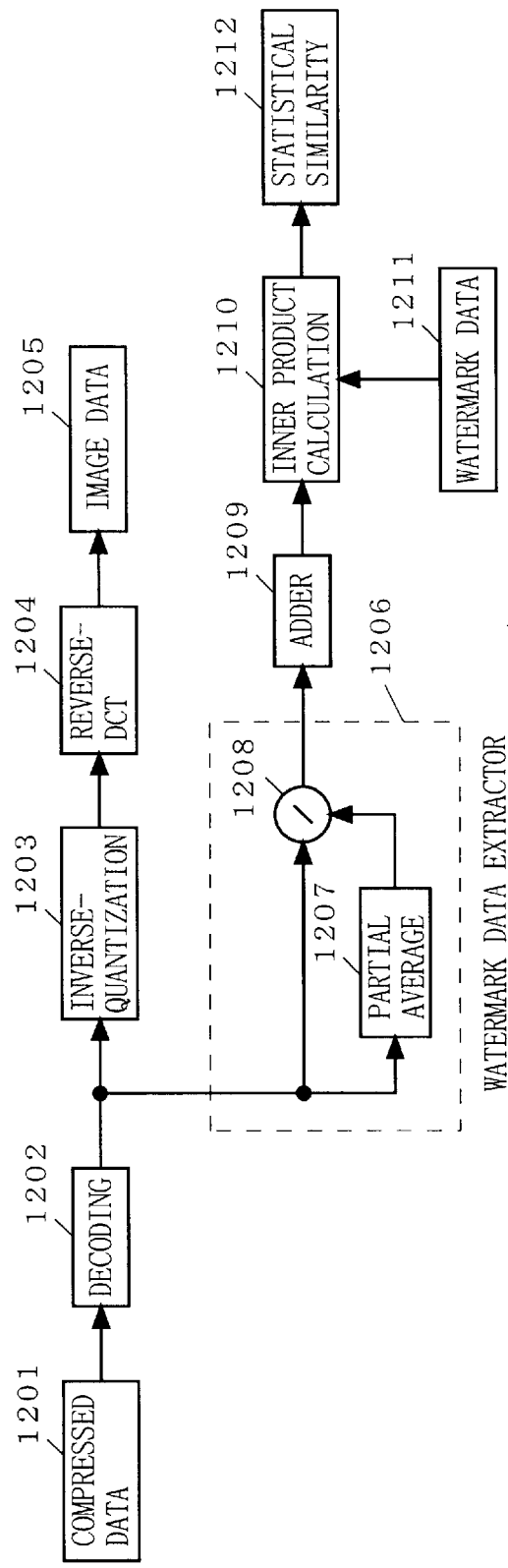
FIG. 13 is a block diagram illustrating an example of the conventional watermark extracting method.

For example, referring to FIG. 11, consider the case that a pseudo-random number sequence is embedded in wavelet coefficients HL2, LH2, and HH2 (each one pixel) and HL1, LH1, and HH1 (each four pixels) that correspond to a block of 4×4 pixels of an original image. In this case, the weight sequence is made greater as the frequency band is higher (that is, greater in HL1, LH1, and HH1 than in HL2, LH2, and HH2). Alternatively, the weight sequence may be dynamically changed depending on the value of the wavelet coefficient of LL2 (MRA), or may be dynamically changed depending on the value of MRR excluding MRA (in this case, HL2, LH2, HH2, HL1, LH1, and HH1).

The constants $\alpha$ and $\beta$ described in the first and second embodiments may not be the same for each element of the transform coefficients sequence.

Typically, the functions of the digital information embedding/extracting apparatus of the first and second embodiments are implemented by a memory (a ROM, a RAM, a hard disk, and the like) that stores predetermined program data and a central processing unit (CPU) executing the program data. The program data may be installed via a recording medium such as a CD-ROM and a floppy disk.

While the invention has been described in detail, the foregoing description is in all aspects illustrative and not restrictive. It is understood that numerous other modifications and variations can be devised without departing from the scope of the invention.

What is claimed is:

1. A digital information embedding apparatus for embedding inherent digital information in a digital image signal, comprising:
    a transform coefficient calculation section for decomposing said digital image signal into frequency components and calculating transform coefficients for a plurality of blocks each composed of a predetermined number of pixels;
    a mapping section for mapping the inherent digital information with a pseudo-random number sequence;
    an information embedding section for selecting a specific transform coefficients sequence from the transform coefficients calculated in said transform coefficient calculation section and embedding said pseudo-random number sequence in the specific transform coefficients sequence based on a predetermined weight sequence corresponding to elements of the transform coefficients, for each of said blocks;
    a quantization section for quantizing said embedding-processed transform coefficients; and
    an encoding section for encoding said quantized transform coefficients.

2. The digital information embedding apparatus according to claim 1, wherein said weight sequence is set so that as a frequency component of a transform coefficient outputted from the transform coefficient calculation section shifts in frequency from low to high, a value of the corresponding element of the weight sequence is greater.

3. The digital information embedding apparatus according to claim 1, wherein a quantization table used for encoding of said digital image signal is used for said weight sequence.

4. The digital information embedding apparatus according to claim 1, wherein said weight sequence is set dynamically depending on a value of a DC component of the transform coefficient outputted from said transform coefficient calculation section for each of said blocks.

5. The digital information embedding apparatus according to claim 1, wherein said weight sequence is set dynamically depending on an average of specific AC components of a transform coefficient outputted from said transform coefficient calculation section for each of said blocks.

6. The digital information embedding apparatus according to claim 1, wherein said information embedding section comprises:
    an absolute calculator for calculating an absolute of each element of the specific transform coefficients sequence selected from the transform coefficients outputted from said transform coefficient calculation section;
    a first multiplier for multiplying the absolute of each element outputted from said absolute calculator by a first set value;
    a second multiplier for multiplying each element of said weight sequence by a second set value;
    a first adder for adding an output of said second multiplier to an output of said first multiplier for each element;
    a third multiplier for multiplying an output of said first adder by said pseudo-random number sequence for each element; and
    a second adder for adding an output of said third multiplier to the output of said transform coefficient calculation section for each element.

7. The digital information embedding apparatus according to claim 1, wherein said transform coefficient calculation section performs any of discrete cosine transform, Fourier transform, and Hadamard transform.

8. The digital information embedding apparatus according to claim 1, wherein said transform coefficient calculation section performs any of discrete wavelet transform and sub-band division.

9. A digital information embedding apparatus for embedding inherent digital information in a digital image signal, comprising:
    a transform coefficient calculation section for decomposing said digital image signal into frequency components and calculating transform coefficients for a plurality of blocks each composed of a predetermined number of pixels;
    a quantization section for quantizing the transform coefficients outputted from said transform coefficient calculation section;
    a mapping section for mapping the inherent digital information with a pseudo-random number sequence;
    an information embedding section for selecting a specific transform coefficients sequence from said quantized transform coefficients and embedding said pseudo-random number sequence in the specific transform coefficients sequence based on a predetermined weight sequence corresponding to elements of the transform coefficients, for each of said blocks; and an encoding section for encoding said embedding-processed transform coefficients.

10. The digital information embedding apparatus according to claim 9, wherein said weight sequence is set so that as a frequency component of a transform coefficient outputted from the transform coefficient calculation section shifts in frequency from low to high, a value of the corresponding element of the weight sequence is greater.

11. The digital information embedding apparatus according to claim 9, wherein a quantization table used for encoding of said digital image signal is used for said weight sequence.

12. The digital information embedding apparatus according to claim 9, wherein said weight sequence is set dynamically depending on a value of a DC component of the transform coefficient outputted from said transform coefficient calculation section for each of said blocks.

13. The digital information embedding apparatus according to claim 9, wherein said weight sequence is set dynamically depending on an average of specific AC components of a transform coefficient outputted from said transform coefficient calculation section for each of said blocks.

14. The digital information embedding apparatus according to claim 9, wherein said information embedding section comprises:

an absolute calculator for calculating an absolute of each element of the specific transform coefficients sequence selected from the transform coefficients outputted from said quantization section;

a first multiplier for multiplying the absolute of each element outputted from said absolute calculator by a first set value;

a second multiplier for multiplying each element of said weight sequence by a second set value;

a first adder for adding an output of said second multiplier to an output of said first multiplier for each element;

a third multiplier for multiplying an output of said first adder by said pseudo-random number sequence for each element; and a second adder for adding an output of said third multiplier to the output of said quantization section for each element.

15. A digital information extracting apparatus for extracting inherent digital information embedded in a specific transform coefficients sequence among transform coefficients calculated by decomposing a digital image signal into frequency components by a specific apparatus, comprising:

a decoding section for receiving compressed data encoded and outputted by said specific apparatus and decoding the compressed data;

an inverse-quantization section for performing inverse quantization for data outputted from the decoding section;

a correlation value calculation section for calculating an inner product between said specific transform coefficients sequence among data outputted from said inverse-quantization section and each of a plurality of pseudo-random number sequences including a pseudo-random number sequence associated with said inherent digital information embedded by said specific apparatus;

a pseudo-random number sequence determination section for determining a pseudo-random number sequence embedded in the data based on a value of the inner product outputted from said correlation value calculation section; and an information generation section for generating inherent digital information mapped with said determined pseudo-random number sequence.

16. A digital information extracting apparatus for extracting inherent digital information embedded in a specific quantized transform coefficients sequence among transform coefficients calculated by decomposing a digital image signal into frequency components by a specific apparatus, comprising:

a decoding section for receiving compressed data encoded and outputted by said specific apparatus and decoding the compressed data;

a correlation value calculation section for calculating an inner product between said specific quantized transform coefficients sequence among data outputted from said decoding section and each of a plurality of pseudo-random number sequences including a pseudo-random number sequence associated with said inherent digital information embedded by said specific apparatus;

a pseudo-random number sequence determination section for determining a pseudo-random number sequence embedded in the data based on a value of the inner product outputted from said correlation value calculation section; and an information generation section for generating inherent digital information mapped with said determined pseudo-random number sequence.

17. A digital information embedding apparatus for removing only desired digital information among a plurality of digital information embedded in a specific transform coefficients sequence calculated by decomposing a digital image signal into frequency components by a specific apparatus based on a weight sequence, comprising:

a decoding section for receiving compressed data encoded and outputted by said specific apparatus and decoding the compressed data;

an inverse-quantization section for performing inverse quantization for data outputted from said decoding section;

a mapping section for mapping said desired digital information with a pseudo-random number sequence;

an information embedding section for selecting a specific transform coefficients sequence in which said desired digital information has been embedded from data outputted from said inverse-quantization section, and embedding said pseudo-random number sequence in the specific transform coefficients sequence;

a quantization section for quantizing said embedding-processed transform coefficients; and an encoding section for encoding said quantized transform coefficients.

18. The digital information embedding apparatus according to claim 17, wherein said information embedding section comprises:

an absolute calculator for calculating an absolute of each element of said specific transform coefficients sequence selected from data outputted from said inverse-quantization section;

a first multiplier for multiplying the absolute of each element outputted from said absolute calculator by a first set value;

a second multiplier for multiplying each element of said weight sequence used by said specific apparatus by a second set value;

an adder for adding an output of said second multiplier to an output of said first multiplier for each element;

a third multiplier for multiplying an output of said adder by said pseudo-random number sequence for each element; and a subtracter for subtracting an output of said third multiplier from the output of said inverse-quantization section.

19. The digital information embedding apparatus according to claim 17, wherein said information embedding section comprises:

an absolute calculator for calculating an absolute of each element of said specified transform coefficients sequence selected from data outputted from said inverse-quantization section;

a first multiplier for multiplying the absolute of each element outputted from said absolute calculator by a first set value;

a second multiplier for multiplying an output of said first multiplier by said pseudo-random number sequence for each element; and a subtracter for subtracting an output of said second multiplier from the output of said inverse-quantization section.

20. A digital information embedding apparatus for removing only desired digital information among a plurality of digital information embedded in a specific quantized transform coefficients sequence calculated by decomposing a digital image signal into frequency components by a specific apparatus based on a weight sequence, comprising:

a decoding section for receiving compressed data encoded and outputted by said specific apparatus and decoding the compressed data;

a mapping section for mapping said desired digital information with a pseudo-random number sequence;

an information embedding section for selecting a specific quantized transform coefficients sequence in which said desired digital information has been embedded from data outputted from said decoding section, and embedding said pseudo-random number sequence in the specific transform coefficients sequence; and an encoding section for encoding said embedding-performed transform coefficients.

21. The digital information embedding apparatus according to claim 20, wherein said information embedding section comprises:

an absolute calculator for calculating an absolute of each element of said specified transform coefficients sequence selected from data outputted from said decoding section;

a first multiplier for multiplying the absolute of each element outputted from said absolute calculator by a first set value;

a second multiplier for multiplying each element of said weight sequence used by said specific apparatus by a second set value;

an adder for adding an output of said second multiplier to an output of the first multiplier for each element;

a third multiplier for multiplying an output of said adder by said pseudo-random number sequence for each element; and a subtracter for subtracting an output of said third multiplier from the output of said decoding section.

22. The digital information embedding apparatus according to claim 20, wherein said information embedding section comprises:

an absolute calculator for calculating an absolute of each element of said specified transform coefficients sequence selected from data outputted from said decoding section;

a first multiplier for multiplying the absolute of each element outputted from said absolute calculator by a first set value;

a second multiplier for multiplying an output of said first multiplier by said pseudo-random number sequence for each element; and a subtracter for subtracting an output of said second multiplier from the output of said decoding section.

23. A digital information embedding method for embedding inherent digital information in a digital image signal, comprising the steps of:

decomposing said digital image signal into frequency components and calculating transform coefficients for a plurality of blocks each composed of a predetermined number of pixels;

mapping the inherent digital information with a pseudo-random number sequence;

selecting a specific transform coefficients sequence from said calculated transform coefficients, and embedding said pseudo-random number sequence in the specific transform coefficients sequence based on a predetermined weight sequence corresponding to elements of the transform coefficients, for each of said blocks;

quantizing said embedding-processed transform coefficients; and encoding said quantized transform coefficients.

24. A digital information embedding method for embedding inherent digital information in a digital image signal, comprising the steps of:

decomposing said digital image signal into frequency components and calculating transform coefficients for a plurality of blocks each composed of a predetermined number of pixels;

quantizing said calculated transform coefficients;

mapping the inherent digital information with a pseudo-random number sequence;

selecting a specific transform coefficients sequence from the quantized transform coefficients, and embedding said pseudo-random number sequence in the specific transform coefficients sequence based on a predetermined weight sequence corresponding to elements of the transform coefficients, for each of said blocks; and encoding said embedding-processed transform coefficients.

25. A digital information extracting method for extracting inherent digital information embedded in a specific transform coefficients sequence among transform coefficients calculated by decomposing a digital image signal into frequency components by a specific apparatus, said method comprising the steps of:

receiving compressed data encoded and outputted by said specific apparatus and decoding the compressed data;

performing inverse quantization for said decoded data;

calculating an inner product between said specific transform coefficients sequence among said inverse-quantized data and each of a plurality of pseudo-random number sequences including a pseudo-random number sequence associated with said inherent digital information embedded by said specific apparatus;

determining a pseudo-random number sequence embedded in the data based on a calculated value of said inner product; and generating inherent digital information mapped with said determined pseudo-random number sequence.

26. The digital information extracting method according to claim 25, wherein said step of determining a pseudo-random number sequence includes determining a pseudo-random number sequence providing said inner product greater than a predetermined threshold value as the embedded pseudo-random number sequence.

27. A digital information extracting method for extracting inherent digital information embedded in a specific quantized transform coefficients sequence among transform coefficients calculated by decomposing a digital image signal into frequency components by a specific apparatus, said method comprising the steps of:

receiving compressed data encoded and outputted by said specific apparatus and decoding the compressed data;

calculating an inner product between said specific quantized transform coefficients sequence among said decoded data and each of a plurality of pseudo-random number sequences including a pseudo-random number sequence associated with said inherent digital information embedded by said specific apparatus;

determining a pseudo-random number sequence embedded in the data based on a calculated value of said inner product; and generating inherent digital information mapped with said determined pseudo-random number sequence.

28. The digital information extracting method according to claim 27, wherein said step of determining a pseudo-random number sequence includes determining a pseudo-random number sequence providing said inner product greater than a predetermined threshold value as the embedded pseudo-random number sequence.

29. A digital information embedding method for removing only desired digital information among a plurality of digital information embedded in a specific transform coefficients sequence calculated by decomposing a digital image signal into frequency components by a specific apparatus, said method comprising the steps of:

receiving compressed data encoded and outputted by said specific apparatus and decoding the compressed data;

performing inverse quantization for said decoded data;

mapping said desired digital information with a pseudo-random number sequence;

selecting a specific transform coefficients sequence in which said desired digital information has been embedded from said inverse-quantized data, and embedding said pseudo-random number sequence in the specific transform coefficients sequence;

quantizing said embedding-processed transform coefficients; and encoding said quantized transform coefficients.

30. A digital information embedding method for removing only desired digital information among a plurality of digital information embedded in a specific quantized transform coefficients sequence calculated by decomposing a digital image signal into frequency components by a specific apparatus, said method comprising the steps of:

receiving compressed data encoded and outputted by said specific apparatus and decoding the compressed data;

mapping said desired digital information with a pseudo-random number sequence;

selecting a specific quantized transform coefficients sequence in which said desired digital information has been embedded from said decoded data, and embedding said pseudo-random number sequence in the specific transform coefficients sequence; and encoding said embedding-processed transform coefficients.

31. A recording medium including a program to be executed by a computer recorded thereon, the program at least executing the steps of:

decomposing said digital image signal into frequency components and calculating transform coefficients for a plurality of blocks each composed of a predetermined number of pixels;

mapping the inherent digital information with a pseudo-random number sequence;

selecting a specific transform coefficients sequence from said calculated transform coefficients, and embedding said pseudo-random number sequence in the specific transform coefficients sequence based on a predetermined weight sequence corresponding to elements of the transform coefficients, for each of said blocks;

quantizing said embedding-processed transform coefficients; and encoding said quantized transform coefficients.

32. A recording medium including a program to be executed by a computer recorded thereon, the program at least executing the steps of:

receiving encoded compressed data including inherent digital information embedded in a specific transform coefficients sequence calculated by decomposing a digital image signal into frequency components, and decoding the compressed data;

performing inverse quantization for said decoded data;

calculating an inner product between said specific transform coefficients sequence among said inverse-quantized data and each of a plurality of pseudo-random number sequences including a pseudo-random number sequence associated with said inherent digital information embedded by said specific apparatus;

determining a pseudo-random number sequence embedded in the data based on a calculated value of said inner product; and generating inherent digital information mapped with said determined pseudo-random number sequence.

33. A recording medium including a program to be executed by a computer recorded thereon, the program at least executing the steps of:

receiving encoded compressed data including a plurality of inherent digital information embedded in a specific transform coefficients sequence calculated by decomposing a digital image signal into frequency components, and decoding the compressed data;

performing inverse quantization for said decoded data;

mapping said desired digital information with a pseudo-random number sequence;

selecting a specific transform coefficients sequence in which said desired digital information has been embedded from said inverse-quantized data, and embedding said pseudo-random number sequence in the specific transform coefficients sequence;

quantizing said embedding-processed transform coefficients; and encoding said quantized transform coefficients.

* * * * *